United States Patent [19]

Shinya et al.

[11] Patent Number: 5,044,230
[45] Date of Patent: Sep. 3, 1991

[54] GEAR SHIFT CONTROLLING DEVICE OF AUTOMATIC TRANSMISSION

[75] Inventors: Yoshiyuki Shinya; Hiroshi Monden, both of Hiroshima, Japan

[73] Assignee: Mazda Motor Corporation, Hiroshima, Japan

[21] Appl. No.: 542,829

[22] Filed: Jun. 25, 1990

[30] Foreign Application Priority Data

Jun. 26, 1989 [JP] Japan ................................. 1-162899

[51] Int. Cl.⁵ ............................................. B60K 41/06
[52] U.S. Cl. .................................................... 74/866
[58] Field of Search ................ 74/865, 866; 364/424.1

[56] References Cited

U.S. PATENT DOCUMENTS

| | | | |
|---|---|---|---|
| 4,868,753 | 9/1989 | Mori | 74/866 X |
| 4,933,859 | 6/1990 | Tsuyama et al. | 74/866 X |
| 4,947,330 | 8/1990 | Hiramatsu | 74/866 |
| 4,970,916 | 11/1990 | Narita | 364/424.1 X |
| 4,977,992 | 12/1990 | Ohtsuka et al. | 74/866 X |

FOREIGN PATENT DOCUMENTS 62-220750 9/1987 Japan.
62-220752 9/1987 Japan.

Primary Examiner—Leslie A. Braun
Attorney, Agent, or Firm—Sixbey, Friedman, Leedom & Ferguson

[57] ABSTRACT

According to the gear shift controlling device of the automatic transmission of the present invention, by using an engine load signal for which decreasing change was tempered, in the case where the actual engine load decreases the working state of engine is prevented from crossing the gear shift line for shift up on a gear shift diagram at the time of deceleration running with an accelerator pedal closed. Therefore, contingent shift up at deceleration running can be prevented and lack of working of the engine brake can be eliminated. In addition, unnecessary shift down following the shift up can be prevented and proper gear shift control according to the running state can be carried out.

4 Claims, 9 Drawing Sheets

| K1 | Tvo (deg) | | | | | | |
|---|---|---|---|---|---|---|---|
| | 0 | 10 | 20 | 30 | 40 | 60 | 80 |
| Vs (km/h) 0 | 0.05 | 0.05 | 0.05 | 0.05 | 0.05 | 0.05 | 0.05 |
| 30 | 0.04 | 0.04 | 0.03 | 0.03 | 0.03 | 0.03 | 0.03 |
| 60 | 0.03 | 0.03 | 0.02 | 0.02 | 0.02 | 0.02 | 0.02 |
| 90 | 0.03 | 0.03 | 0.02 | 0.02 | 0.02 | 0.02 | 0.02 |
| 120 | 0.03 | 0.03 | 0.02 | 0.02 | 0.02 | 0.02 | 0.02 |
| 180 | 0.03 | 0.03 | 0.02 | 0.02 | 0.02 | 0.02 | 0.02 |

FIG. 10 (b)

| K1 | Tvo (deg) | | | | | | |
|---|---|---|---|---|---|---|---|
| | 0 | 10 | 20 | 30 | 40 | 60 | 80 |
| Vs (km/h) 0 | 0.07 | 0.07 | 0.07 | 0.07 | 0.07 | 0.07 | 0.07 |
| 30 | 0.07 | 0.07 | 0.06 | 0.06 | 0.05 | 0.05 | 0.05 |
| 60 | 0.07 | 0.06 | 0.06 | 0.06 | 0.05 | 0.05 | 0.05 |
| 90 | 0.06 | 0.06 | 0.06 | 0.05 | 0.05 | 0.05 | 0.05 |
| 120 | 0.06 | 0.06 | 0.05 | 0.05 | 0.05 | 0.05 | 0.05 |
| 180 | 0.06 | 0.06 | 0.05 | 0.05 | 0.05 | 0.05 | 0.05 |

GEAR SHIFT CONTROLLING DEVICE OF AUTOMATIC TRANSMISSION

BACKGROUND OF THE INVENTION

1. Field of the Invention

This invention relates to an improvement of a gear shift controlling device of an automatic transmission, particularly to a device of preventing contingent shift up when an accelerator pedal is released.

2. Description of the Prior Art

As a conventional gear shift control of an automatic transmission, the Japanese Patent Application Laying Open Gazette No. 62-220752, for example, discloses such control device that a gear shift diagram according to the vehicle speed and the opening of a throttle valve is stored beforehand and on the basis of such gear shift diagram, gear shift is automatically controlled in such a way that it is shifted up or shifted down to the gear shift stage corresponding to momentary speeds and openings of the throttle valve of a running vehicle or it maintains existing gear shift stage.

Figure 13:
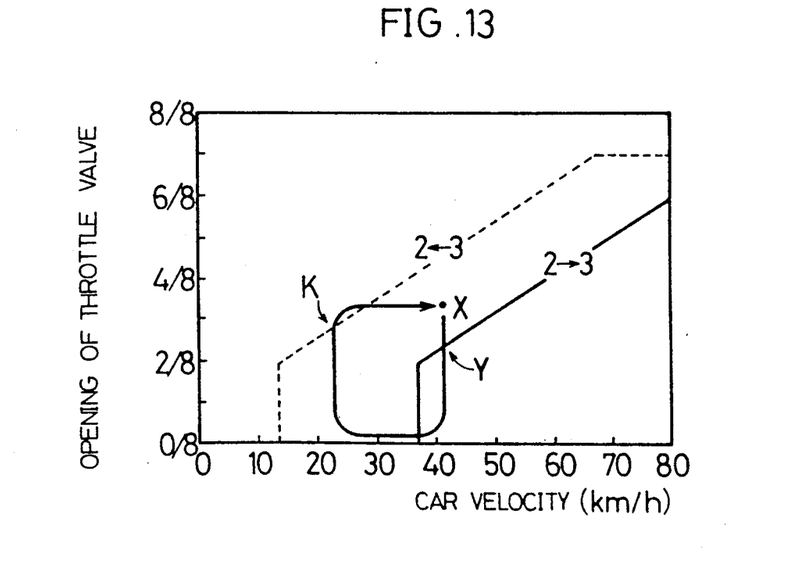
FIG. 13 is an explanatory drawing of a conventional example.

In the above conventional automatic gear shift control, however, we have such defects that even if an accelerator pedal is released and a throttle valve is closed, an engine brake refuses to work and contingent shift down occurs at re-accelerating after deceleration. More concretely, in the case where a gear shift diagram is stored as shown in FIG. 13, at the time of deceleration when an accelerator pedal is released so as to work an engine brake while a car is running by selecting the second gear at the point X in the figure, with the opening of the throttle valve becoming fully closed, working state of the engine in the gear shift diagram is shifted up to the third gear across the 2→3 gear shift line at the point Y in the figure and thus the engine brake refuses to work. In addition, when an accelerator pedal is stepped on and the opening of the throttle valve is increased so as to accelerate again after deceleration, working state of the engine is shifted down contingently to the second gear across the 2←3 gear shift line at the point K in the figure and accordingly, momentary lowering of driving force is caused and behaviour change of a vehicle body occurs, with the result that a driver is given an unpleasant feeling and car wheels becomes easy to slip, with bad influence upon running capacity of a car. These defects are especially conspicuous at the road where curves are continuous.

In order to avoid such unnecessary shift up at the time of deceleration running as mentioned above, in the Japanese Patent Application Laying Open Gazette No. 62-220750 it is so composed that, separately from the gear shift diagram set usually, another gear shift diagram for shifting gears on the basis of only the opening of the throttle valve is set and by controlling gear shift at the deceleration running on the basis of this gear shift diagram, sudden shift up at the time of deceleration running is avoided.

As another composition which solves the above problem, in U.S. patent application Ser. No. 384,714 (title of the invention: Control System for Automatic Transmission) filed on Jul. 25, 1989 by the present inventor, when the state requiring shift up at the speed lower than the vehicle speed set beforehand is detected, an output of shift up gear shift signal on the basis of this detection is delayed by the set time and if during this set time the state of deceleration running is reached (when the opening of the throttle valve is fully closed), the above output of shift up gear shift signal is released and no output is given. Thus, shift up at the time of deceleration running is avoided.

The present invention has for its object to prevent contingent shift up when an accelerator pedal is released and also subsequent contingent shift down when a pedal is stepped on and thus carry out a proper gear shift control.

In order to attain the above object, in the present invention it is so designed that when the engine braking with the accelerator pedal released is required, working state of the engine does not cross the shift up gear shift line according to the gear shift diagram.

Concretely, a solution to the problem by the present invention is premised on a gear shift controlling device of an automatic transmission whereby gear shift of the automatic transmission is controlled by the load on engine and the no. of revolutions (r.p.m.) of an engine driving system, such as vehicle speed. This device is provided with a load detecting means which detects load on engine and a signal change adjusting means which tempers the change of engine load signals which are detected by the load detecting means. This device also has a controlling means which receives outpus of the load detecting means and the signal change adjusting means and controls gear shift of the automatic transmission in such a way that gear shift is controlled according to the engine load signal and the r.p.m. of the engine driving system, on the basis of the engine load signal of the load detecting means when the engine load detected by the load detecting means increases and on the basis of the engine load signal for which signal change was tempered by the signal change adjusting means when the engine load detected by the load detecting means decreases.

Under the above composition, in the present invention at the time of acceleration when an accelerator pedal is stepped on and load on engine increases, actual engine load signal detected by the load detecting means is selected and therefore working state of the engine on the gear shift diagram changes according to actual change and thus usual automatic gear shift is obtained.

Figure 12:
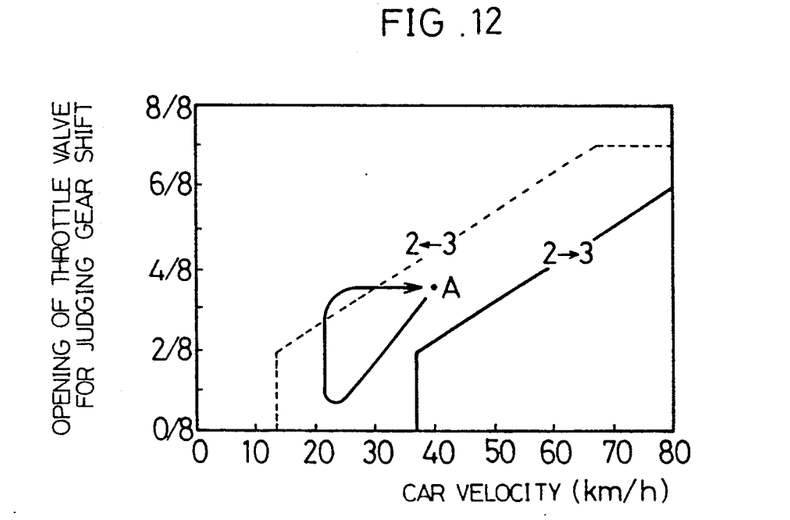
FIG. 12 is an explanatory drawing of operation.

When a driver requires deceleration with an accelerator pedal released during running, an engine load signal which is tempered in change by the signal change adjusting means is selected and by this selection, working state of the engine on the gear shift diagram does not cross the shift up gear shift line as it is changing in downward direction toward the left side of the figure according to the decrease of r.p.m. of the engine driving system as shown in FIG. 12 and thus contingent shift up can be prevented.

After the above deceleration, when a driver steps on an accelerator pedal and the opening of the throttle valve increases, the engine load signal of the load detecting means is selected and working state of the engine on the gear shift diagram changes according to actual change and crosses the shift down gear shift line but since the shift up is prevented originally as mentioned above, no shift down occurs.

The object and novel features of the present invention will be understood more clearly by reading the following description, with reference to the accompanying drawings.

BRIEF DESCRIPTION OF THE DRAWINGS

The accompanying drawings show preferred embodiments of the present invention, in which:

FIG. 1 to FIG. 12 show embodiments of the present invention, in which

DETAILED DESCRIPTION OF THE INVENTION

A description is made below of preferred embodiments of the present invention on the basis of the accompanying drawings.

Figure 1:
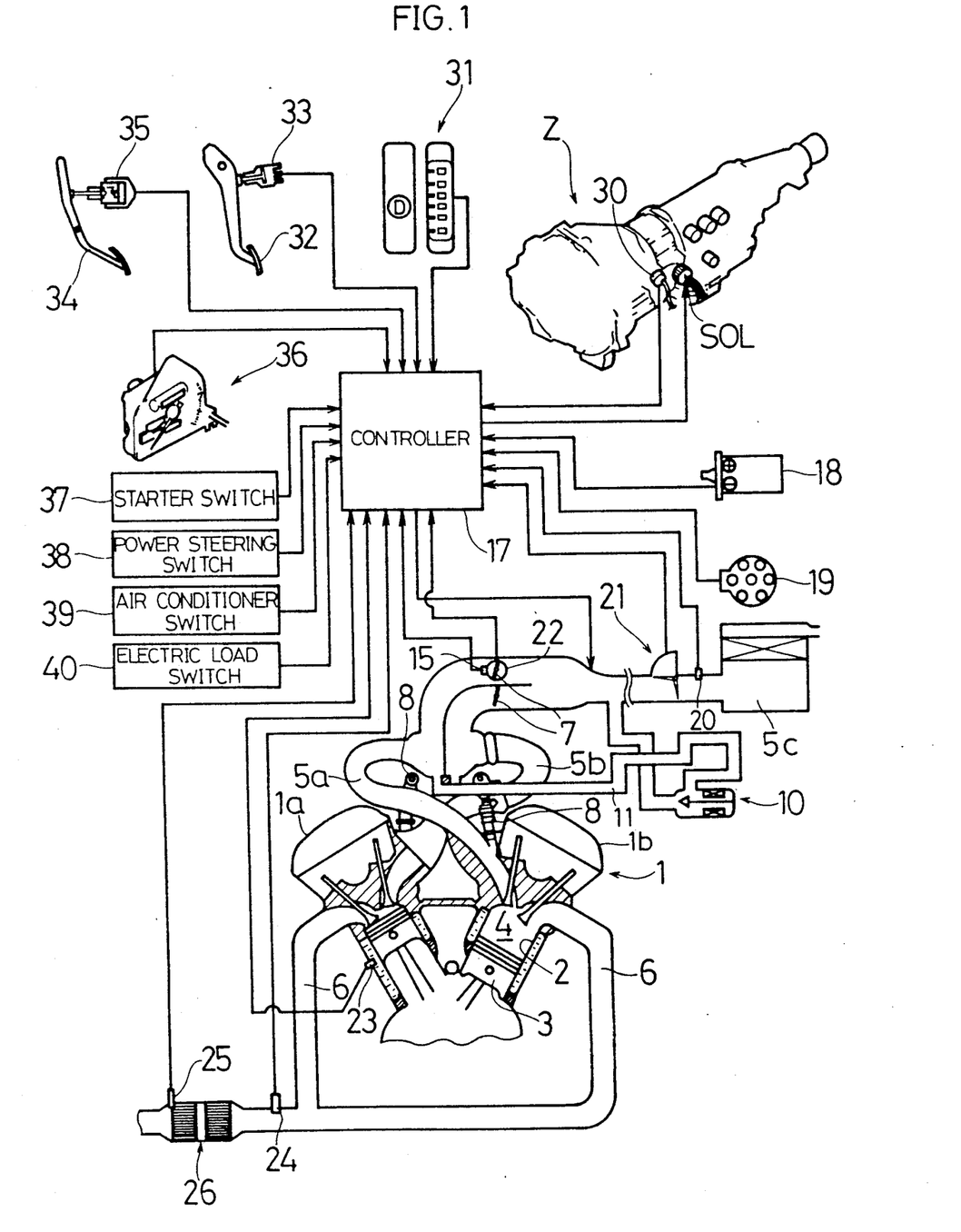
FIG. 1 shows a rough composition of the whole body.

In FIG. 1, reference numeral 1 denotes a V type engine. A combustion chamber 4 which is variable in volume by a piston 3 inserted in a cylinder 2 is formed at each bank 1a, 1b (left and right). Each combustion chamber 4 communicates with and is open to the atmosphere via independent air intake passages 5a, 5b and a single collective air intake passage 5c which joins both independent air intake passages at the end of their upstream side. A throttle valve 7 which controls the amount of air intake is provided near the end of upstream side of each independent air intake is passage and a fuel jetting valve 8 which supplies fuel by jetting is provided at the downstream side of the throttle valve 7. Reference numeral 10 denotes an idle r.p.m. adjusting device which adjusts the idle r.p.m. of the engine 1 to a target valve by adjusting the amount of bypass air intake of an air intake bypass passage 11 which bypasses the throttle valve 7.

Symbol Z is an automatic transmission connected to an output shaft of the engine 1. The automatic transmission Z has within a torque converter, a multi-stage planetary gear mechanism, a lockup clutch, various friction elements of said planetary gear mechanism and a plurality of solenoids SOL for gear shifting which throws in and releases the lockup clutch.

Reference numeral 15 denotes an opening sensor as a load detecting means which detects the engine load according to the opening of the throttle valve 7. The throttle valve opening signal is inputted to a controller 17 having within CPU, etc. Inputted to the controller 17 are ignition signals of an ignition coil 18, singals of crank angle and engine r.p.m. which are detected by a crank angle sensor 19, signals of intake air temperature which is detected by an intake air temperature sensor 20, signals of intake air amount which is detected by an air flow sensor 21, signals of fully closing of the throttle valve 7 which is detected by an idle switch 22, signals of engine cooling water temperature which is detected by a water temperature sensor 23, signals of air/fuel ratio of mixture which is detected by an $O_2$ sensor 24 and signals of catalyst temperature of a catalyst converter 26 arranged in common with an exhaust passage 6 to be detected by a catalyst sensor 25. Inputted further to the controller 17 are detection signals of a turbine sensor 30 which detects the turbine r.p.m. of the torque converter, an inhibitor switch 31 which detects the range position selected by a select lever of the automatic transmission Z, namely, detects D (automatic gear shift up to the fourth gear), N (neutral), R (retreat), S (automatic gear shift up to the third gear) and L (automatic gear shift up to the second gear), a brake switch 33 which detects the time at which a brake pedal 32 is stepped on, a kick down switch 35 whichd detects the time at which kick down is required by the amount of stepping on an accelerator pedal 34, a vehicle speed sensor 36 which detects the vehicle speed, a starter switch 37 of the engine 1, a power steering switch 38 which detects the time at which the power steering device is worked, an air conditioner switch 39 which detects the time of working the air conditioner provided in the car and an electric load switch 40 which detects the time at which electric load (light, etc.) is worked.

Figure 7:
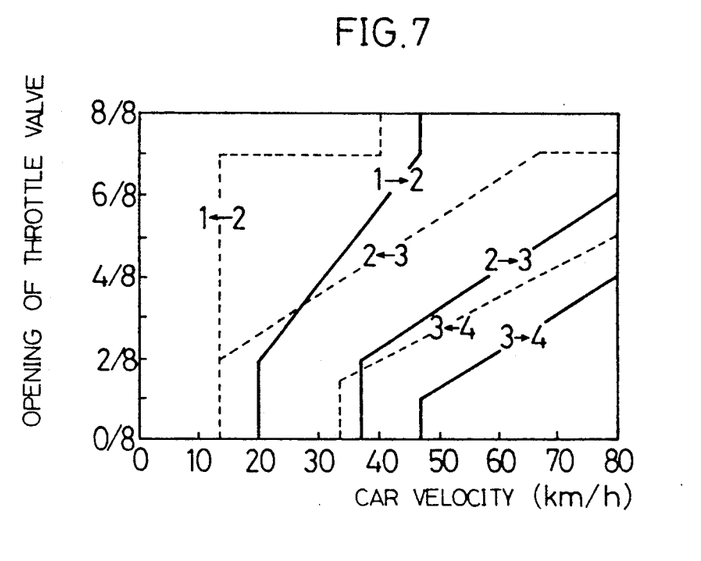
FIG. 7 shows an example of a gear shift diagram.

Stored beforehand in the controller 17 are a shift up vehicle speed table and a shift down vehicle speed table which correspond to each gear shift map of shift up and shift down according to the vehicle speed and the opening of throttle valve shown in FIG. 7. The controller 17 has such function that it controls the automatic gear shift of the automatic transmission Z on the basis of the opening of the throttle valve corresponding to the engine load and the vehicle speed corresponding to r.p.m. of the engine driving system.

Figure 2:
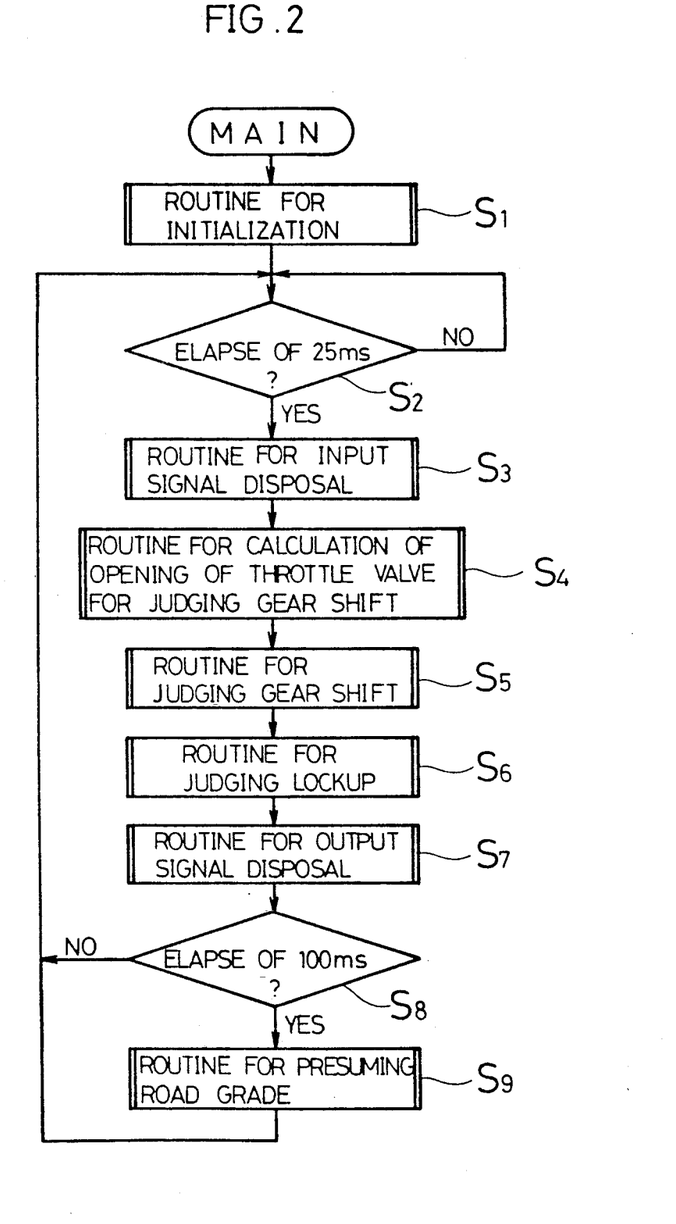
FIG. 2 to FIG. 6 are respectively a flow chart of an automatic gear shift by a controller.

The automatic gear shift control is explained below on the basis of the control flow of FIG. 2.

Upon starting, routine for initializing the data is disposed at the step $S_1$ and then whether or not 25 msec has elapsed is judged so as to repeat the control at each set time (25 msec, for example) at the step $S_2$. If elapsed, routine for disposing input signals is done at the step $S_3$ and the opening of the throttle valve for judging gear shift is calculated by the calculation routine in FIG. 3 at the step $S_4$.

Figure 4:
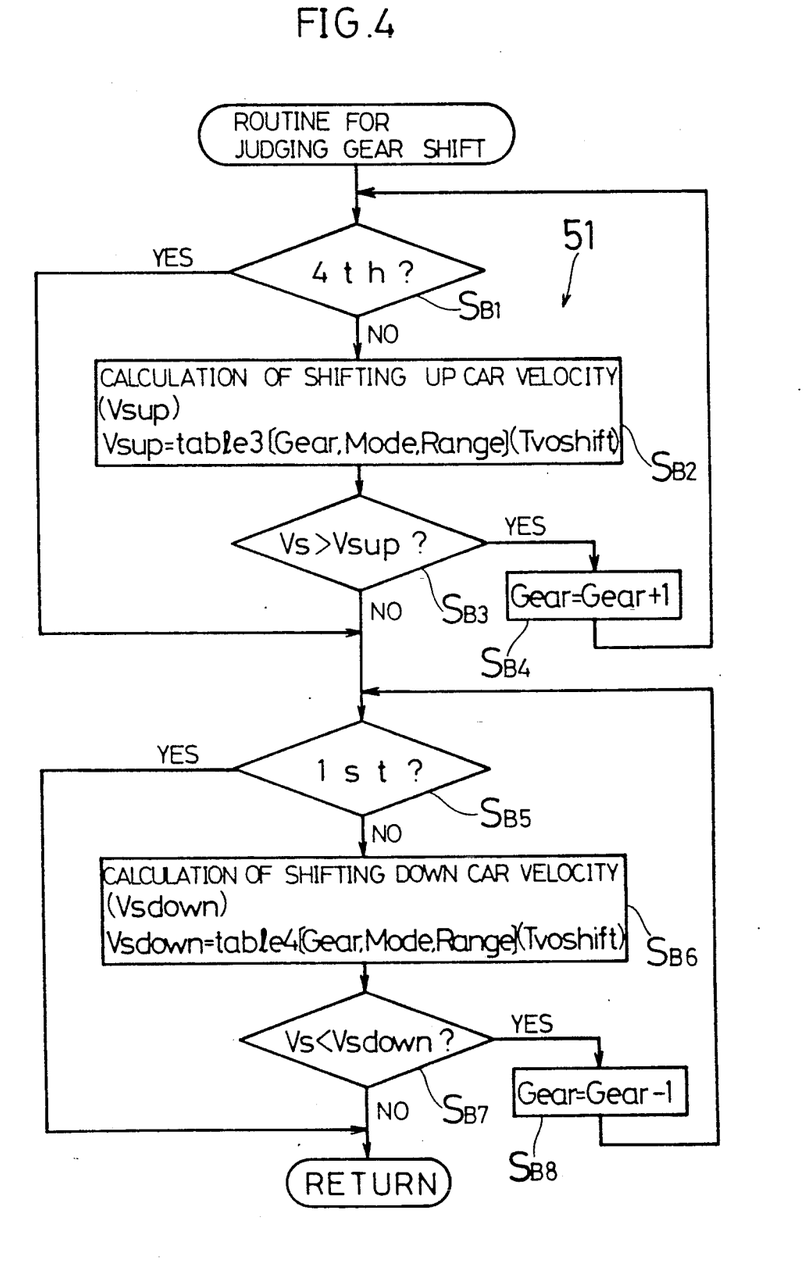
Figure 5:
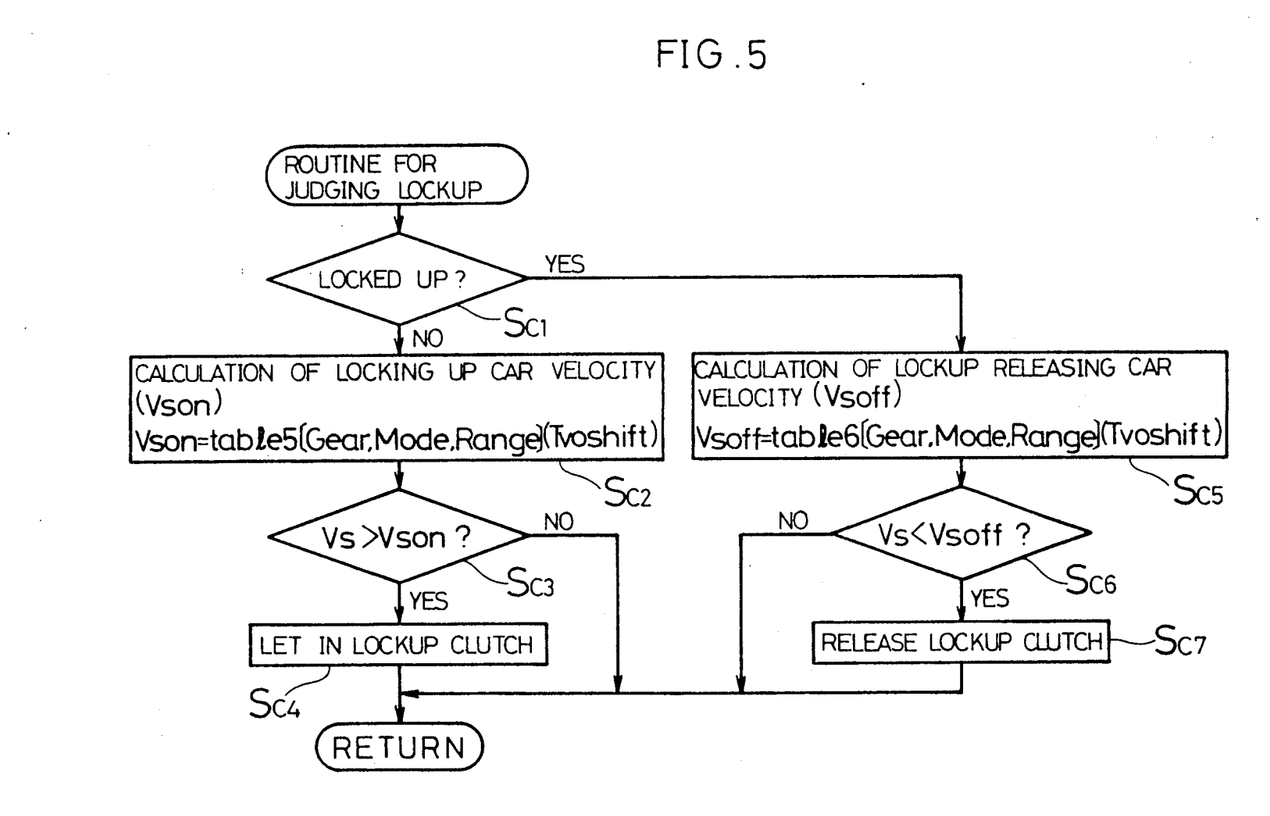

After the opening of the throttle valve for judging gear shift was calculated, judgement of gear shift shown in FIG. 4 and judgement of lockup of automatic transmission shown in FIG. 5 are carried out on the basis of the opening calculated at the step $S_5$ and the step $S_6$ respectively, and at the step $S_7$ the routine for output signal disposal is disposed so as to output output signals according to the judgment.

Then, with the lapse of the specified time (100 ms, for example) at the step $S_8$ the routine for presuming the road grade is done at the step $S_9$ so as to correct the opening of the throttle valve by the grade of the road on which a vehicle is running and then return to the step $S_2$.

An explanation is made below about the routine for calculating the opening of throttle valve for judging gear shift in FIG. 3. The opening of throttle valve for judging gear shift Tvoshift in this routine corresponds to a value which is the larger of two openings (actual opening of the throttle valve Tvo and the opening value to be calculated by the formula $K \cdot Tvo + (1-K) \cdot Tvo$-shift for tempering the reduction change of the opening by a coefficient of tempering K).

Figure 8A:
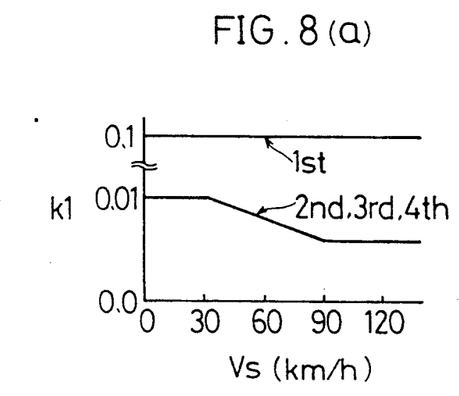
FIG. 8 shows tales of the coefficient of tempering at the time of selecting power mode and at the time of selecting economy mode.
Figure 8B:
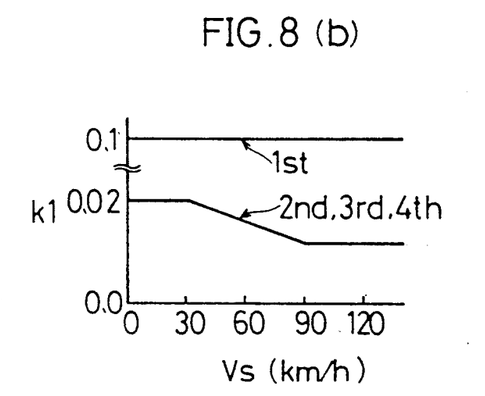
Figure 9:
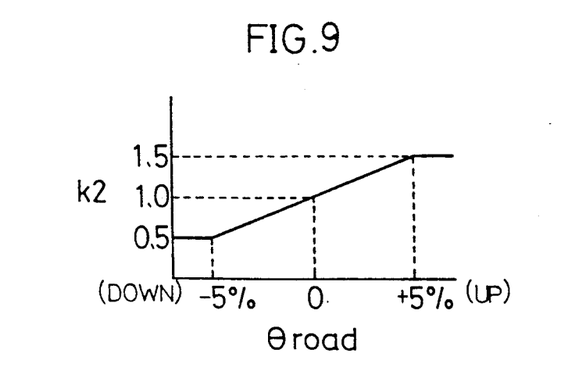
FIG. 9 shows a table of correcting the coefficient of tempering.

The coefficient of tempering K by which the opening for judging gear shift Tvoshift is obtained is calculated by $K=K_1\times K_2$ as shown at the steps $S_{A2}$ and $S_{A3}$ and is changed to a different value according to the state of the idle switch 22 as shown at the step $S_{A1}$. More particularly, when the idle switch 22 is ON (namely, when the opening of the throttle valve is fully closed), in order to make shift up difficult so that the engine brake works well the coefficient of tempering K is set at a small value at the step $S_{A2}$ on the basis of each table in FIG. 8 and FIG. 9. Table 2 in FIG. 8 is for calculating the coefficient $K_1$. FIG. 8(a) and FIG. 8(b) show the table at the selection of power made and at the selection of economy mode respectively. In the case of power mode of FIG. 8(a), the coefficient $K_1$ is made smaller so as to realize more prompt working and in the case of economy mode in FIG. 8(b), the coefficient $K_1$ is made larger to effect shift up promptly. Both in FIG. 8(a) and FIG. 8(b), the coefficient $K_1$ is made smaller in proportion to the increase of vehicle speed. This is because in view of the fact that as shown in FIG. 7, the higher the vehicle speed, the larger the opening of the throttle valve for shift up and the easier to shift up, it is intended to decrease the opening for judging gear shift gently in proportion to the increase of vehicle speed. Both in FIG. 8(a) and FIG. 8(b), the coefficient $K_1$ at the first gear is set at a constant value. This is because at the first gear which is at D range position, the engine brake does not work due to working of a one-way clutch and therefore it is desired to shift up to the second gear promptly. Table 1 in FIG. 9 is for calculating the coefficient $K_2$. The coefficient $K_2$ is set at a value larger than 1.0 when the road grade ($\theta$ road) is upward slope but set at a value smaller than 1.0 when the road grade is downward slope. This is because at the downslope, lowering of vehicle speed is slow and therefore decrease of the opening for gear shift judging Tvoshift will become quick relatively if the coefficient $K_2$ is set at a value on the same level with the case of a flatland. Thus, it is necessary to set the coefficient $K_2$ at a smaller value to make the decrease of the opening more gently.

Figure 3:
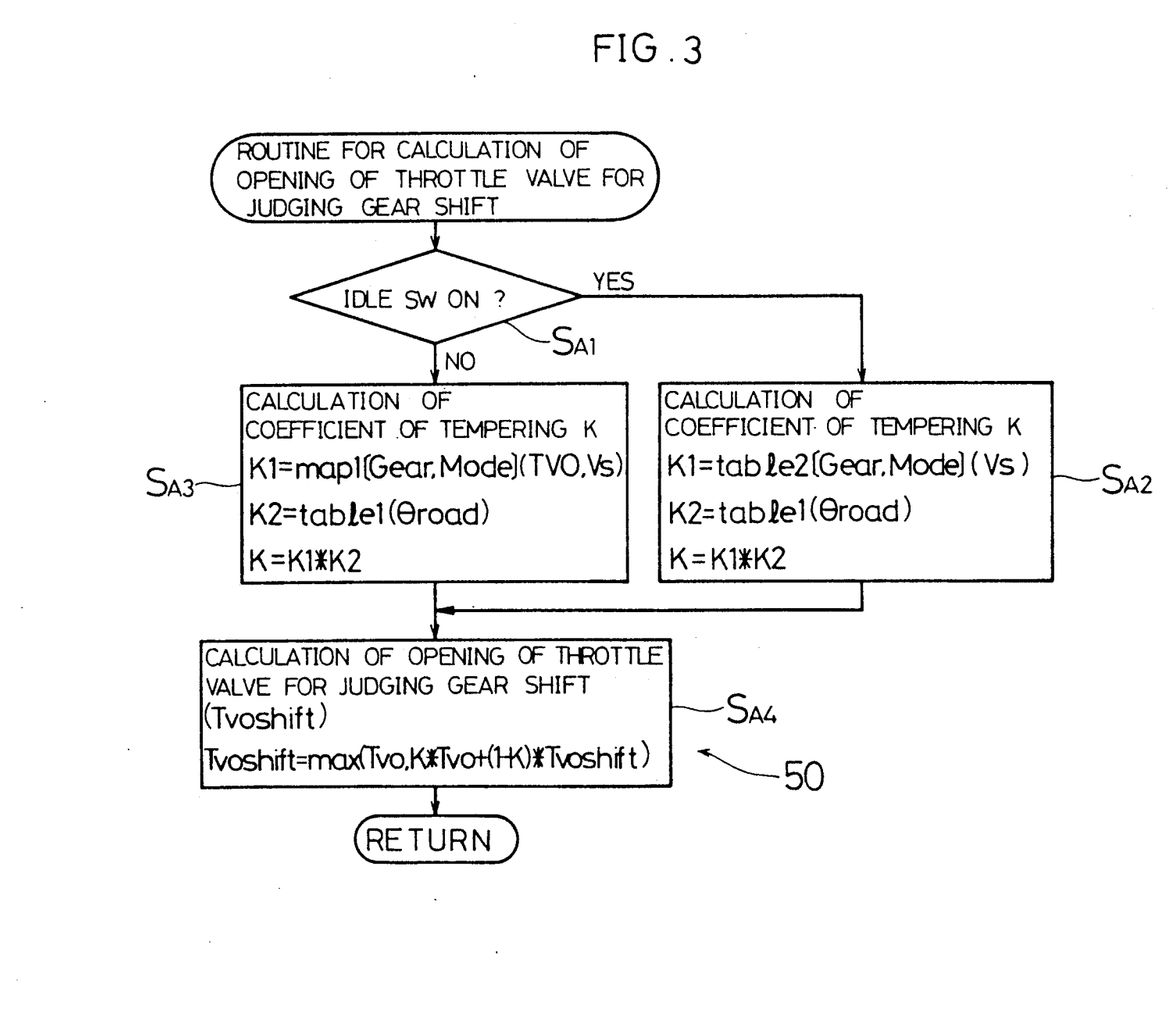
Figure 10:
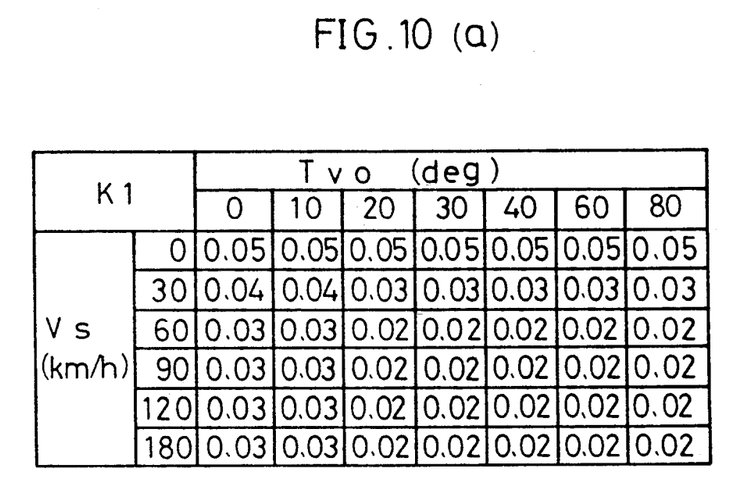
FIG. 10 shows maps of the coefficient of tempering at the time of selecting power mode and at the time of selecting economy mode.

At the step $S_{A1}$ in FIG. 3, in the case where the throttle valve is not fully closed (the idle switch is not in OFF state), a driver is more or less stepping on an accelerator pedal and it is possible to shift up. Therefore, in order to avoid giving the feeling of engine racing, the coefficient $K_1$ should be set at a large value to shift up earlier and is calculated on the basis of the vehicle speed Vs and the opening of the throttle valve Tvo, as shown in the coefficient $K_1$ maps of FIG. 10(a) and FIG. 10(b) (FIG. 10(a) is in the case of selecting power mode and FIG. 10(b) is in the case of selecting economy mode). The reason why calculation is made on the basis of the opening of the throttle valve Tvo is that in consideration of the fact that shift up may be caused, depending upon the way of deciding the gear shift diagram in FIG. 7, the coefficient $K_1$ which corresponds to the existing working state of the engine corresponding to the opening of the throttle valve Tvo and the vehicle speed Vs is decided so as to make the degree of change in the decrease of the opening for gear shift judging Tvoshift correspond well to the gear shift diagram.

An explanation is made about the routine for judging gear shift in FIG. 4. At the step $S_{B1}$, it is judged whether or not the gear shift stage is the fourth gear and if it is not the fourth gear, at the step $S_{B2}$ the shift up vehicle speed Vsup is calculated from the shift up table 3 which corresponds to the gear shift diagram shown in FIG. 7, for example, according to the existing gear shift stage, running mode, range position and Tvoshift (opening of the throttle valve for judging gear shift) and at the step $S_{B3}$, if the existing vehicle speed Vs is larger than Vsup, at the step $S_{B4}$ gear shift stage is shifted up by one stage.

Then, at the step $S_{B5}$, the existing gear shift stage is grasped and if it is not the first gear, at the step $S_{B6}$ the shift down vehicle speed Vsdown in calculated from the shift down vehicle speed table 4 in the same way as mentioned above and at the step $S_{B7}$, if the existing vehicle speed Vs is smaller than Vsdown, at the step $S_{B8}$ the gear shift stage is shifted down by one stage and return.

Thus, a signal change adjusting means 50 which tempers the change of signals of throttle valve opening as engine load signals (to be detected by the opening sensor 15) with the coefficient of tempering K, on the basis of the calculation formula $K\cdot Tvo+(1-K)\cdot Tvoshift$ at the step $S_{A4}$ of calculation routine in FIG. 3, is composed. The opening of the throttle valve for judging gear shift to be calculated at the step $S_{A4}$ of the calculation routine corresponds to the larger of actual value of the opening Tvo and a value of opening for which reduction change was tempered, namely, corresponds to the value equal to the actual value of the opening Tvo when the opening of the throttle valve (engine load) increases but corresponds to the signal of throttle valve opening for which reduction change was tempered when the opening of the throttle valve decreases. A control means 51 which controls the automatic transmission Z by the shift up vehicle speed table and the shift down vehicle speed table corresponding to the gear shift diagram in FIG. 7 on the basis of the opening for judging gear shift Tvoshift and according to the opening for judging gear shift Tvoshift and the vehicle speed Vs on the basis of the routine for judging gear shift in FIG. 4, is composed.

An explanation is made below about the routine for judging lockup in FIG. 5. At the step $S_{C1}$, it is judged whether or not a lockup clutch is thrown in (locked up) and if not locked up, at the step $S_{C2}$ the vehicle speed Vson which carries out lockup on the basis of the lockup vehicle speed table 5 is calculated according to the existing gear shift stage, running mode, range position and the opening of the throttle valve for judging gear shift Tvoshift. At the step $S_{C3}$, the existing vehicle speed Vs is compared with the lockup vehicle speed Vson and if Vs>Von, at the step $S_{C4}$ the lockup clutch is thrown in and return.

Similarly, if locked up, at the step $S_{C5}$ the vehicle speed Vsoff which releases lockup is calculated on the basis of the lockup releasing vehicle speed table 6 and then at the step $S_{C6}$, if it is found that Vs<Vsoff, at the step $S_{C7}$ throwing in of the lockup clutch is released and return.

Figure 6:
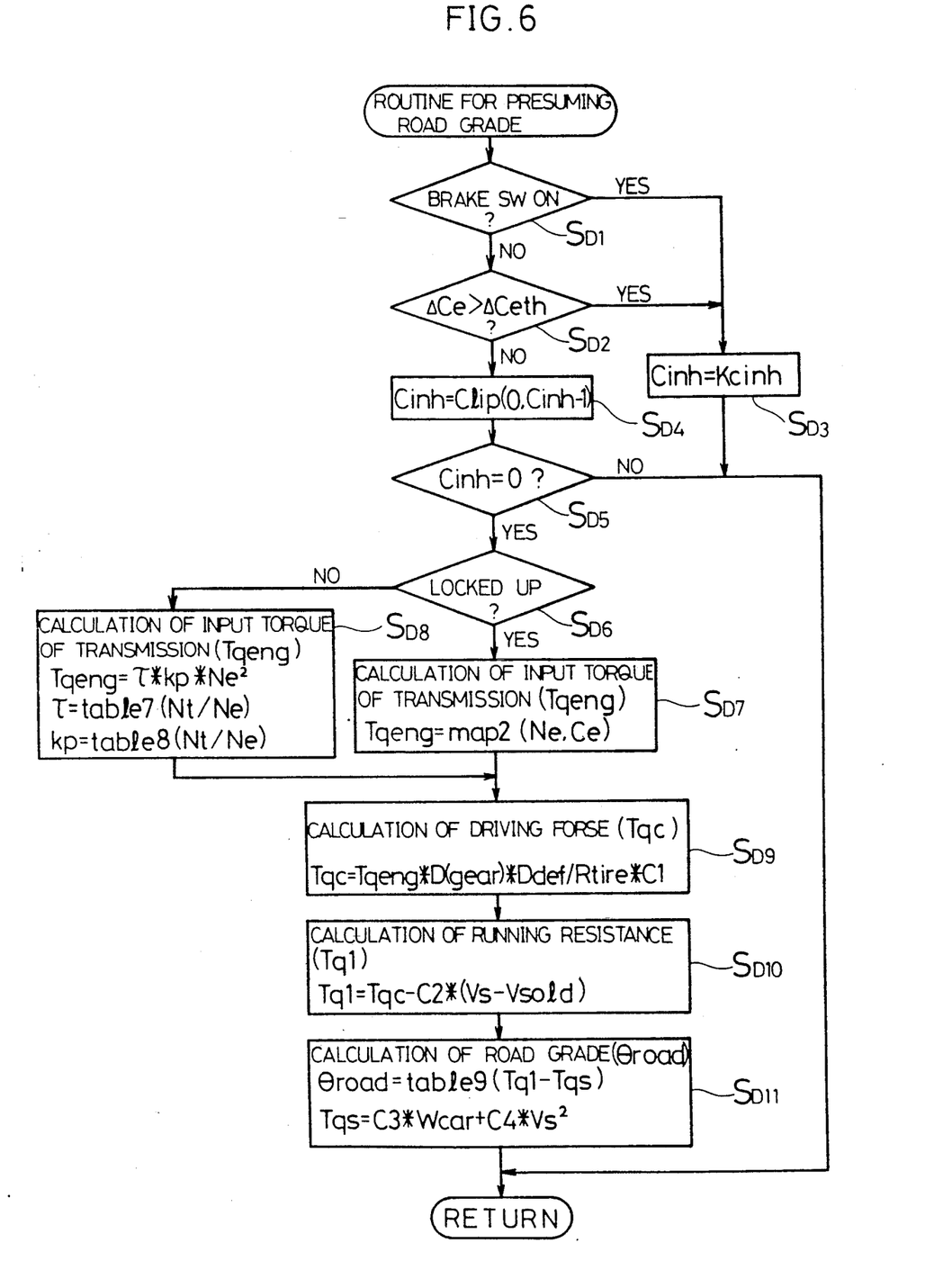

An explanation is made below about the routine for presuming the road grade in FIG. 6. This routine is for calculating the coefficient $K_2$ in FIG. 9 from the road grade ($\theta$ road). More particularly, if the brake does not act on wheels (the brake 33 is OFF) at the step $S_{D1}$ and if the change of intake filling up efficiency $\Delta Ce$ is less than the set value $\Delta Ceth$ at the step $S_{D2}$, subtraction of the set value Kcinh initially set at the step $S_{D3}$ is started at the step $S_{D4}$, and only when the subtraction counter Cinh becomes 0 at the step $S_{D5}$, presumption of the road grade is commenced at and after the step $S_{D6}$. More particularly, at the step $S_{D6}$ it is judged whether or not the lockup clutch is locked up and if locked up, at the step $S_{D7}$ input torque Tqeng of the automatic transmission Z is calculated from the engine torque map 2 based on the r.p.m. of engine Ne and the amount of intake filled Ce. On the other hand, if not locked up, at the step $S_{D8}$ input torque Tqueng of the transmission is calculated from the following formula on the basis of the r.p.m. of engine Ne, torque ratio $\tau$ of the automatic transmission Z and the coefficient of capacity Kp.

$$Tqeng = \tau Kg \cdot Ne^2$$

The torque ratio $\tau$ and the coefficient of capacity Kp are calculated from the torque ratio table 7 and the coefficient of capacity table 8 corresponding to the r.p.m. of engine Ne and the r.p.m. of turbine Nt respectively.

Then, at the step $S_{D9}$ driving force Tqc is calculated from the following formula, on the basis of input torque Tqeng of the transmission Z, gear ratio D(gear), torque gear ratio Ddef, tire effective radius Rtire and constant C1.

$$Tqc = \{Tqeng \cdot D(gear) \cdot Ddef / Rtire\} \cdot C1$$

Then, at the step $S_{D10}$ running resistance Tq1 is calculated from the following formula, on the basis of driving force Tqc, vehicle speeds at this time and at the preceding time Vs, Vsold and constant C2.

$$Tq1 = Tqc - \{C2 \cdot (Vs - Vsold)\}$$

At the step $S_{D11}$, the road grade $\theta$ road is calculated from the road grade calculation table 9 based on running resistance Tq1 and running resistance Tqs at a flatland and return. The running resistance Tqs at a flatland in this case is calculated from the following formula, on the basis of car weight Wcar and constants C3 and C4.

$$Tqs = C3 \cdot Wcar + C4 \cdot Vs^2$$

An explanation is made below about the operation of the above embodiment.

Figure 11:
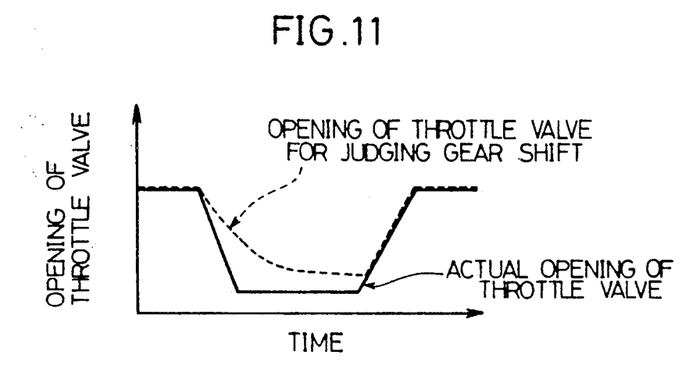
FIG. 11 is an explanatory drawing of the state of change of the opening of a throttle valve for judging gear shift.

As shown in FIG. 11, in the case where the actual opening of the throttle valve varies as shown by a solid line, the opening of the throttle valve for judging gear shift Tvoshift shown by a broken line is gentler in the degree of decreasing change due to the signal change adjusting means 50 than the actual value of opening when the actual opening of the throttle valve decreases but the former remains the same as the latter when the actual opening of the throttle valve increases.

From the above, as shown in FIG. 12 when a vehicle approaches the corner at the point of engine working state shown by the symbol A (the second gear) and a drive works the throttle valve 7 in closing direction, the actual opening of the throttle valve decreases suddenly at almost the same vehicle speed (around 40 km/h in the figure) as shown in FIG. 13, but since the opening of the throttle valve for judging gear shift Tvoshift is gentle in decreasing change, it decreases slowly as the vehicle speed drops from 40 km/h. As a result, on the gear shift diagram in FIG. 12, the working state of engine does not cross the 2→3 shift up line and therefore the gear shift stage is maintained at the second gear and the engine brake acts effectively.

Then, when a driver steps on the throttle valve 7 at a way out of the corner so as to accelerate, the opening of the throttle valve Tvoshift for judging gear shift increases immediately in accordance with the actual opening. In this case, the working state of engine crosses the 2←3 shift down line but since the second gear is maintained originally, shift down does not occur. Therefore, shift up following the full closing of the opening of the throttle valve and shift down following the increase of the opening of the throttle valve which have been experienced conventionally can be prevented. Thus, proper gear shift control can be carried out and improvement of running capacity can be planned.

Moreover, in this embodiment at the full closing of the opening of the throttle valve, at selection of the power mode, at a high vehicle speed and at a downward slope, the degree of decreasing change of the opening of the throttle valve for judging gear shift Tvoshift is made more gentle and therefore shift up due to decreasing change of the opening of the throttle valve can be prevented more accurately.

What is claimed is:

1. A gear shift controlling device of an automatic transmission which controls gear shift of the automatic transmission on the basis of engine load and r.p.m. of engine driving system, comprising:
    a load detecting means to detect engine load;
    a signal change adjusting means to temper the change of engine load signals detected by said load detecting means; and
    a control means which receives outputs of said load detecting means and signal change adjusting means and controls gear shift of the automatic transmission according to the engine load signal and the r.p.m. of engine driving system, on the basis of the engine load signal of the load detecting means when the engine load detected by the load detecting means increases and on the basis of the engine load signal for which change was tempered by the signal change adjusting means when the engine load detected by the load detecting means decreases.

2. A gear shift controlling device of an automatic transmission as defined in claim 1, wherein the signal change adjusting means varies the degree of the tempering the change of engine load signals on the basis of the coefficient of tempering.

3. A gear shift controlling device of an automatic transmission as defined in claim 2, wherein the coefficient of tempering of the signal change adjusting means varies according to the full closing and non-full closing of the throttle valve, power mode and economy mode of automatic gear shift diagram, high and low vehicle speed, gear shift stage and/or downward slope and upward slope.

4. A gear shift controlling device of an automatic transmission as defined in claim 2 or claim 3, wherein the load detecting means detects the engine load by the opening of the throttle valve Tvo, the signal change adjusting means calculates the opening of the throttle valve for which change was tempered Tvoshift from the formula $K \cdot Tvo + (1-K) \cdot Tvoshift$ on the basis of the coefficient of tempering K, and the control means takes the larger of Tvoshift (opening of the throttle valve for which change was tempered) and Tvo (actual opening of the throttle valve) as the opening of the throttle valve for judging gear shift.

* * * * *